(12) United States Patent
Vallart et al.

(10) Patent No.: US 9,815,561 B2
(45) Date of Patent: Nov. 14, 2017

(54) DEVICE FOR REGULATING THE SPEED OF ROTATION OF A ROTORCRAFT ROTOR, A ROTORCRAFT FITTED WITH SUCH A DEVICE, AND AN ASSOCIATED REGULATION METHOD

(71) Applicant: AIRBUS HELICOPTERS, Marignane (FR)

(72) Inventors: Jean-Baptiste Vallart, Aix en Provence (FR); Setareh Taheri, Aix en Provence (FR); Nicolas Certain, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/272,898

(22) Filed: Sep. 22, 2016

(65) Prior Publication Data
US 2017/0088281 A1    Mar. 30, 2017

(30) Foreign Application Priority Data
Sep. 25, 2015 (FR) .................................. 15 01994

(51) Int. Cl.
*B64D 31/06* (2006.01)
*B64C 27/12* (2006.01)
(Continued)

(52) U.S. Cl.
CPC .............. *B64D 31/06* (2013.01); *B64C 27/12* (2013.01); *B64C 27/57* (2013.01); *B64D 43/00* (2013.01)

(58) Field of Classification Search
CPC ........ B64D 31/06; B64D 43/00; B64C 27/12; B64C 27/57
(Continued)

(56) References Cited

U.S. PATENT DOCUMENTS 6,198,991 B1    3/2001 Yamakawa et al.
8,442,740 B2    5/2013 Rossotto
(Continued)

FOREIGN PATENT DOCUMENTS

FR    2974564    11/2012
FR    2981045    4/2013
(Continued)

OTHER PUBLICATIONS

Schaefer et al. 47th Forum American Helicopter Society 1991; p. 1293-1303, "Enhanced energy maneuverability for attack helicopters using continuous variable rotor speed control".
(Continued)

*Primary Examiner* — Yazan Soofi
(74) *Attorney, Agent, or Firm* — Brooks Kushman P.C.

(57) ABSTRACT

A device for regulating the speed of rotation of at least one main rotor of a rotorcraft, which speed is known as the speed NR. Such a rotorcraft comprises at least one manual flight control member for delivering a collective pitch control setpoint C for the blades of the at least one main rotor, the control setpoint C being a function of a current position of the at least one control member; and detector means enabling a current state to be detected from at least two distinct states of the rotorcraft, namely a "ground" state in which the rotorcraft is in contact with the ground, at least in part, and a "flight" state in which the rotorcraft is at least being sustained in the air.

15 Claims, 4 Drawing Sheets

(51) Int. Cl.
*B64C 27/57* (2006.01)
*B64D 43/00* (2006.01)

(58) Field of Classification Search
USPC .............................................................. 701/7
See application file for complete search history.

(56) References Cited

U.S. PATENT DOCUMENTS

| | | | |
|---|---|---|---|
| 9,073,635 B2 | 7/2015 | Mezan | |
| 9,193,453 B2 | 11/2015 | Vallart et al. | |
| 9,676,490 B2* | 6/2017 | Vallart | B64D 31/06 |
| 2007/0118254 A1 | 5/2007 | Barnes et al. | |
| 2016/0144971 A1* | 5/2016 | Vallart | F02C 9/42 |
| | | | 701/3 |
| 2016/0327958 A1* | 11/2016 | Vallart | G05D 1/0676 |

FOREIGN PATENT DOCUMENTS

| | | |
|---|---|---|
| FR | 3000466 | 7/2014 |
| GB | 2192163 | 1/1988 |
| WO | 2010143051 | 12/2010 |

OTHER PUBLICATIONS

French Search Report for French Application No. FR 1501994, Completed by the French Patent Office dated Jun. 14, 2016, 7 Pages.

\* cited by examiner

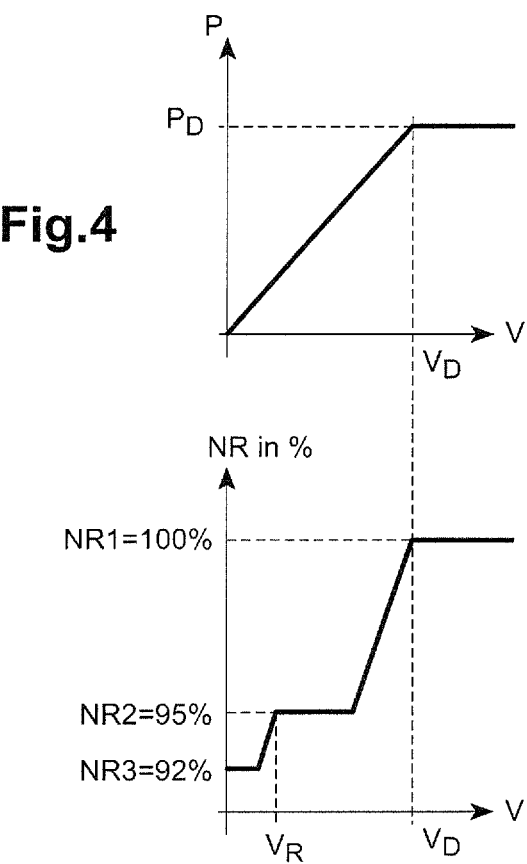

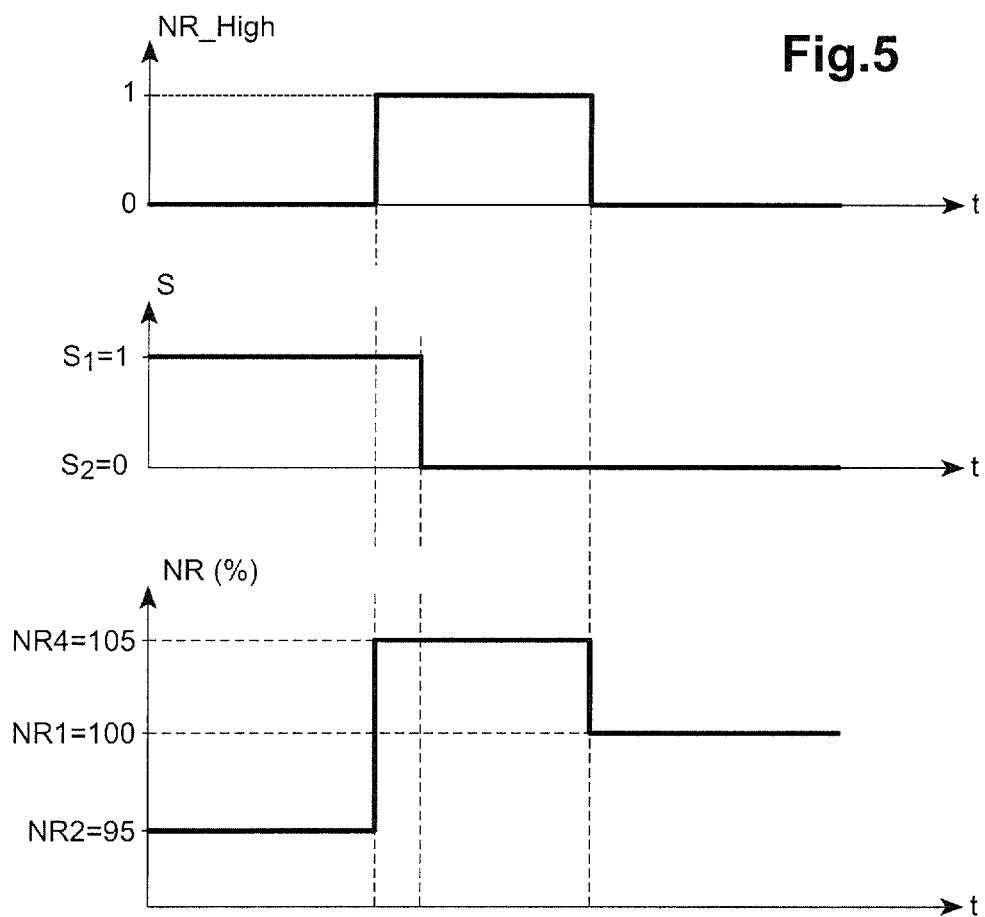
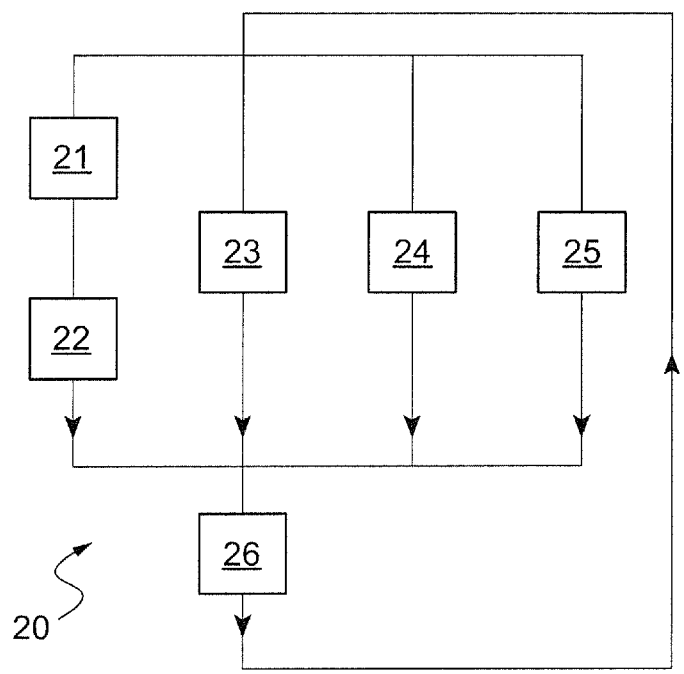

DEVICE FOR REGULATING THE SPEED OF ROTATION OF A ROTORCRAFT ROTOR, A ROTORCRAFT FITTED WITH SUCH A DEVICE, AND AN ASSOCIATED REGULATION METHOD

CROSS REFERENCE TO RELATED APPLICATION

This application claims priority to French patent application No. FR 15 01994 filed on Sep. 25, 2015, the disclosure of which is incorporated in its entirety by reference herein.

BACKGROUND OF THE INVENTION (1) Field of the Invention

The present invention relates to a device for regulating the speed of rotation of at least one main rotor of a rotorcraft, known as the speed NR. Such a speed NR is thus a function directly of the quantity of fuel injected into the engine for producing combustion that is to drive rotation of the main rotor.

Thus, the present invention also lies in the field of methods of regulating the operation of one or more engines in a power plant of a rotorcraft. By way of example, such a power plant may have at least one main fuel-burning engine, in particular a turboshaft engine, conventionally delivering the mechanical power needed by the rotorcraft for driving at least one or more rotors of the rotorcraft.

Consequently, the present invention lies more specifically in the context of a device and a method for driving at least a main rotor of the rotorcraft, and possibly also for driving an anti-torque rotor, if any, at a setpoint speed that is variable.

(2) Description of Related Art

The main rotor typically provides the rotorcraft at least with lift and possibly also with propulsion and/or changes of attitude in flight for the specific circumstance of a helicopter. The anti-torque rotor typically provides stabilization for the rotorcraft and guidance in yaw, and it is commonly in the form of a tail rotor or at least one propulsive propeller for a rotorcraft having a high speed of advance.

Conventionally, the operation of the main engines of a rotorcraft is under the control of a regulator unit, such as a full authority digital engine control (FADEC). The regulator unit controls the metering of fuel to the main engines as a function of a setpoint, referred to below as the NR setpoint, relating to a speed of rotation that is required from the main rotor. The NR setpoint may thus be generated by the regulator unit (FADEC) under certain particular circumstances. In other particular circumstances, e.g. when the NR setpoint is variable, the NR setpoint may be generated by the electronic, electrical, and computer equipment of the rotorcraft as a whole and then transmitted to the regulator unit (FADEC) by management means, such as an automatic flight control system (AFCS). Under such circumstances, the regulator unit (FADEC) serves to regulate the speed NR.

Thus, the NR setpoint may be transmitted by the management means (AFCS) as a function of the requirements of the rotorcraft for mechanical power as identified depending on the current flight circumstances of the rotorcraft, and in particular as a function of mechanical power requirements for driving the main rotor. By way of example, the power consumed by the main rotor may be identified by evaluating firstly the resisting torque that the main rotor opposes against being driven by the power plant, and secondly by its speed of rotation.

Nevertheless, technical progress in the field of rotorcraft is tending towards driving the main rotor at a controlled speed NR that is variable relative to the nominal speed NR1 as predefined for the most critical conditions for the rotorcraft, e.g. corresponding to occasional complex procedures for takeoff or landing, commonly referred to by the term "CAT A procedures".

Specifically, such significant variation in the speed NR at which the main rotor is driven can be used for optimizing the level of power delivered by the engine as a function of the associated stage of flight, e.g. in order to reduce noise nuisance close to the ground and/or in order to improve performance. By way of indication, the speed of the main rotor may be controlled to vary over a range within 5% to 10% of the nominal speed NR1, and potentially over a larger range depending on technical progress, and more particularly it may be controlled to vary over a range of values that might lie from 90% to 115% of the nominal speed NR1.

On this topic, reference may be made for example to the publication "Enhanced energy maneuverability for attack helicopters using continuous variable rotor speed control" (C. G. Schaefer Jr., F. H. Lutze Jr., 47th Forum American Helicopter Society 1991, pp. 1293-1303). According to that document, the performance of a rotorcraft in a combat situation is improved by varying the speed at which the main rotor is driven, depending on variation in the air speed of the rotorcraft.

Reference may also be made for example to Document U.S. Pat. No. 6,198,991 (Yamakawa et al.), which proposes reducing sound nuisance generated by a rotorcraft approaching a landing point by varying the speed of rotation of the main rotor.

Reference may also be made on this topic by way of example to the Document US 2007/118254 (G. W. Barnes et al.), which proposes varying the speed of rotation of the main rotor of a rotorcraft using two values referred to as high and low, under predefined threshold conditions for values of various parameters associated with previously-identified flight conditions of the rotorcraft.

Also by way of example, reference may be made on this topic to the Document WO 2010/143051 (Agusta Spa et al.), which proposes varying the speed of rotation of a main rotor of a rotorcraft in compliance with a map that has previously been drawn up depending on various flight conditions of the rotorcraft.

Finally, as described by the Applicant in Document FR 3 000 466, it is also known to use an altimeter in order to act automatically to control variation in the speed of rotation over a range from 90% to 110% of a predetermined nominal value.

Furthermore, Documents FR 2 974 564, GB 2 192 163, and FR 2 981 045 describe other devices or methods for regulating a main rotor or a tail rotor of a rotorcraft.

Nevertheless, although such documents describe devices or methods for regulating the speed NR during the flight of a rotorcraft, none of those documents provides a solution enabling the speed NR to be regulated automatically while a rotorcraft is taxiing on the ground, and more particularly during the stages that precede takeoff or that follow landing of such a rotorcraft.

BRIEF SUMMARY OF THE INVENTION

An object of the present invention is thus to propose a device making it possible to overcome the above-mentioned limitations. In particular, an object of the regulation device or the method in accordance with the invention is thus to enable the speed NR of a rotorcraft to be regulated automatically while the rotorcraft is moving on the ground, in particular for the purpose of limiting the sound nuisance it produces prior to takeoff or after landing. Such automatic regulation of the speed NR on the ground thus makes it possible in particular to improve the working conditions of operators working in the immediate vicinity of the rotorcraft during its maneuvers on the ground and also to improve the sound comfort of passengers and crew during stages of boarding and disembarkation.

The invention thus provides a device for regulating the speed of rotation of at least one main rotor of a rotorcraft, which speed is known as the speed NR, such a rotorcraft comprising:

at least one manual flight control member for delivering a collective pitch control setpoint C for the blades of the at least one main rotor, the control setpoint C being a function of a current position of the control member; and detector means enabling a current state to be detected from at least two distinct states of the rotorcraft, namely a "ground" state in which the rotorcraft is in contact with the ground, at least in part, and a "flight" state in which the rotorcraft is at least being sustained in the air.

According to the invention, such a device for regulating the speed NR is remarkable in that it includes management means for automatically controlling the speed NR on at least two mutually distinct predetermined speeds NR1 and NR2, the two predetermined speeds NR1 and NR2 being selected as alternatives as a function firstly of the control setpoint C delivered by the control member, and secondly of the current state of the rotorcraft as detected by the detector means. These management means thus serve to control the speed NR on:

a first speed NR1 when the control setpoint C delivered by the control member is greater than a first predetermined threshold value C1; and a second speed NR2 less than the first speed NR1 when the following two conditions are satisfied;

the control setpoint C delivered by the control member is less than or equal to the first predetermined threshold value C1; and the detected current state of the rotorcraft corresponds to the "ground" state.

In other words, the device in accordance with the invention enables the speed of rotation NR of a rotor to be regulated while the rotorcraft is on the ground and when takeoff is not desired immediately. The rotorcraft pilot may in contrast desire to perform a taxiing maneuver on a runway prior to takeoff, or indeed after landing. Such a desire can then be identified by the position of the control member representative of a collective pitch control setpoint C for the blades, whenever said control setpoint C is less than or equal to the first predetermined threshold value C1.

In addition, such a manual flight control member may advantageously be a collective pitch lever or mini-stick, said member being adapted to enable the angular orientation (the pitch) of the blades of a main rotor of the rotorcraft to be modified simultaneously in identical manner for each blade.

The regulator unit (FADEC) of the regulator device serves to servo-control the speed NR on a second speed NR2 that is less than the first speed NR1, referred to as the nominal speed, and consequently to limit the sound nuisance generated by the rotor when the rotorcraft is on the ground. Specifically, the sound nuisance generated by a rotorcraft rotor is immediately reduced when the speed NR is lowered.

By way of example, the management means are constituted by an AFCS of the rotorcraft and by way of example they comprise:

at least one sensor, e.g. for measuring the speed or the altitude of the rotorcraft;

at least one actuator, e.g. serving to modify a control of a rotor of the rotorcraft; and at least one computer or calculation means for processing the information from at least one sensor of the AFCS in order to generate a control signal for controlling the at least one actuator of the AFCS.

Such management means can thus act independently to control the speed NR on the first speed NR1 or on the second speed NR2 as a function of the control setpoint C delivered by the control member and as a function of the detected current state of the rotorcraft.

Furthermore, in order to determine the "ground" or "flight" current state of the rotorcraft, such a regulator device includes detector means that may be in various forms.

Thus, in a particular embodiment when the rotorcraft landing gear has independent undercarriages, e.g. with wheels, at least one of the undercarriages may include at least one sensor suitable for measuring a reaction force from the ground acting on that undercarriage while the rotorcraft is in contact with the ground.

Under such circumstances, the regulator device can then compare the reaction force(s) measured by the various sensors with predetermined threshold values. A "ground" state can then be identified when each of the reaction forces measured by the various sensors is greater than the threshold value. In contrast, the "flight" state may be identified by way of example when each of the reaction forces measured by the sensors is less than the threshold value.

Furthermore, and in other particular embodiments, such as for example when the rotorcraft landing gear comprises skids, the detector means may be selected from the group comprising air speed indicators, position sensors suitable for measuring a position of a collective pitch lever, or indeed altitude sensors. Thus, data from these various detector means can then enable the current state of the aircraft to be identified indirectly.

In addition, although such a second speed NR2 cannot be used in flight, it may nevertheless be used in order to allow the rotorcraft to move on the ground. The rotorcraft may be required to perform taxiing movements on a runway in order to reach a takeoff point or enter a hangar using a speed NR that is less than that needed for flying.

The speed NR may then pass to a speed NR2 lying for example in the range 92% to 98% of the nominal speed NR1, and which may more particularly be equal to 95% of the nominal speed NR1.

In practice, the management means may control the speed NR on a third speed NR3 less than the second speed NR2 when the control setpoint C delivered by the control member is less than or equal to a second predetermined threshold value C2 and when the detected current state of the rotorcraft corresponds to the "ground" state, the second predetermined threshold value C2 being less than the first predetermined threshold value C1.

In other words, when the control member is placed in a position representative of a control setpoint C less than or equal to the second predetermined threshold value C2 and when the rotorcraft is on the ground, the regulator unit enables the speed of rotation NR to be further reduced to the third speed NR3. By way of example, such a third speed NR2 may correspond to a speed of rotation NR representative of a minimum continuous regulated speed for the power plant. Under such circumstances, the rotorcraft remains stationary relative to the ground and therefore cannot take off.

Such a regulator device then makes it possible to reduce the speed NR and consequently the sound level of a rotorcraft while it is on the ground, and to do so automatically, i.e. without any intervention on the part of the pilot other than modifying the level of the collective pitch for the blades of the main rotor in compliance with the takeoff/landing movement that the pilot is going to undertake.

The speed NR then passes to a speed NR3, e.g. lying in the range 90% to 95% of the nominal speed NR1, and which may more particularly be equal to 92% of the nominal speed NR1.

Advantageously, the rotorcraft may include a selector member that, on being actuated by a pilot of the rotorcraft, delivers a manual instruction to the management means in order to control the speed NR at least temporarily on a fourth speed NR4 greater than the first speed NR1.

Such a selector member may be constituted by a switch or a pushbutton, commonly referred to as the "NR_HIGH" button, being arranged on an upper panel of the cockpit of the rotorcraft. A manual action taken by the pilot on the switch then enables the speed of rotation NR to be increased, e.g. for complex point takeoff or landing procedures commonly known by the term "CAT A" procedures. The speed NR then goes to a value NR4, e.g. lying in the range 102% to 108% of the nominal speed NR1, and may more particularly be equal to 105% of the nominal speed NR1.

Such an arrangement then makes it possible to have a large speed NR only when the type of takeoff or landing justifies such a speed. The use of the switch nevertheless then has the consequence of occasionally inhibiting the noise reduction function while the rotorcraft is on the ground in order to guarantee maximum available power for taking off under critical dynamic conditions.

Furthermore, it is advantageous to take precautions against potential sources of accident risk for the rotorcraft. Such accidents could be caused by the management means in the event of an engine of the rotorcraft failing, or indeed by an error of the detector means in detecting the current state of the rotorcraft.

Thus, in a particular embodiment, the device may include verification means for acting at regular time intervals to verify an operating state of an engine of the rotorcraft for driving rotation of the one main rotor. Thus, the verification means may be suitable for transmitting information to the management means representative of an engine failure in order to enable the management means to inhibit any reduction of the speed NR when the detected current state corresponds to the "ground" state.

By way of example, the verification means may be formed by the regulator unit (FADEC) of the rotorcraft, and may in particular comprise:

at least one sensor, e.g. for measuring the speed of rotation, the temperature, or the torque of an engine of the rotorcraft;

at least one actuator, e.g. for modifying the rate at which fuel is injected into the combustion chamber of the engine in question of the rotorcraft; and at least one computer or calculation means for processing the information from the at least one sensor of the FADEC and then generating a control signal for controlling the at least one actuator of the FADEC.

In this way, regardless of the position of the control member, and thus of the setpoint level delivered by that control member, in the event of an engine failure, the management means control the speed NR on the first speed NR1.

In practice, the device may include calculation means for acting at regular time intervals to calculate the absolute travel speed of the rotorcraft, the management means serving to control the speed NR on:

the first speed NR1 when the following two conditions are satisfied:
   the detected current state of the rotorcraft corresponds to the "ground" state; and
   the absolute travel speed of the rotorcraft is greater than a predetermined absolute travel speed V1; and
the second speed NR2 when the following three conditions are satisfied;
   the control setpoint C delivered by the control member is less than or equal to the first predetermined threshold value C1;
   the detected current state of the rotorcraft corresponds to the "ground" state; and the absolute travel speed of the rotorcraft is less than or equal to the predetermined absolute travel speed V1.

In this way, regardless of the position of the control member, and thus of the setpoint level from the control member, it is possible to take precautions against erroneous information detected by the detector means by consolidating the detected current state with other parameters such as, in particular, the absolute travel speed of the rotorcraft, which on being found to be greater than a predetermined absolute travel speed V1, e.g. equal to 40 knots (kts), causes the management means to control the speed NR on the first speed NR1. Such an absolute travel speed of the rotorcraft is generally calculated by the calculation means on the basis of air speed data.

The air speed data may come from sensors, e.g. unidirectional air speed indicators such as Pitot tubes or probes, or omnidirectional air speed indicators positioned on the rotorcraft.

Thus, such calculation means may comprise in particular:
   at least one air speed indicator enabling a speed of the rotorcraft to be measured, which indicator may for example coincide with the at least one sensor of the AFCS; and
   at least one computer or calculation means for processing information coming from the at least one air speed indicator, which in a particular example may likewise coincide with the at least one computer or calculation means of the AFCS.

Advantageously, the device may include measurement means for acting at regular time intervals to measure the altitude of the rotorcraft relative to the ground, the management means serving to control the speed NR on:

the first speed NR1 when the following two conditions are satisfied:
   the detected current state of the rotorcraft corresponds to the "ground" state; and
   the altitude of the rotorcraft relative to the ground is greater than a predetermined altitude A1; and
the second speed NR2 when the following three conditions are satisfied;
   the control setpoint C delivered by the control member is less than or equal to the first predetermined threshold value C1;
   the detected current state of the rotorcraft corresponds to the "ground" state; and
   the altitude of the rotorcraft relative to the ground is less than or equal to the predetermined altitude A1.

In this way, regardless of the position of the control member, and thus of the level of the setpoint from the control member, it is possible to take precautions against erroneous information detected by the detector means by consolidating the detected current state with other parameters such as, in particular, the altitude of the rotorcraft, such that when the altitude is measured as being greater than a predetermined altitude A1, e.g. equal to 10 feet (ft), the management means control the speed NR on the first speed NR1. Such an altitude of the rotorcraft relative to the ground is generally calculated by measurement means including in particular altitude sensors, such as radio altimeters, that may be positioned on the tail boom of the rotorcraft and directed towards the ground.

As above, such measurement means may comprise in particular:

at least one altitude sensor enabling an altitude of the rotorcraft to be measured, which indicator may for example coincide with the at least one sensor of the AFCS; and at least one computer or calculation means for processing information coming from the at least one altitude sensor, which in a particular example may likewise coincide with the at least one computer or calculation means of the AFCS.

In a particular embodiment, said first predetermined threshold value C1 may lie in a range of values extending from 30% to 60% of a maximum setpoint corresponding to an extreme position for the control member.

In other words, such a range of values for the first predetermined threshold value C1 thus corresponds to a substantially middle or central position for the travel stroke of the control member.

In practice, the second predetermined threshold value C2 may lie in a range of values extending from 15% to 40% of a maximum setpoint corresponding to an extreme position of the control member.

In other words, such a range of values for the second predetermined threshold value C2 then corresponds substantially to an extreme (maximum or minimum) position on the stroke of the control member.

As mentioned above, the invention also provides a rotorcraft including:

at least one main rotor driven by at least one engine;

at least one manual flight control member for delivering a collective pitch control setpoint C for the blades of the main rotor, the control setpoint C being a function of the current position of the control member; and detector means for detecting a current state from among at least two distinct states of the rotorcraft, namely a "ground" state in which the rotorcraft is in contact with the ground, at least in part, and a "flight" state in which the rotorcraft is at least being sustained in the air.

According to the invention, such a rotorcraft is remarkable in that it includes a device as described above for regulating the speed NR.

In other words, the rotorcraft has a regulator device enabling the speed of rotation NR of a rotor to be regulated while the rotorcraft is on the ground and the pilot does not seek to take off immediately, but seeks only to move by taxiing on a runway, for example. Such a desire can then be identified from the position of the control member representing a collective pitch control setpoint C for the blades being less than or equal to the first predetermined threshold value C1.

Finally, the invention also provides a method of regulating the speed of rotation of at least one main rotor of a rotorcraft, known as the speed NR, such a method including at least the following steps:

a manual flight control step of providing a collective pitch control setpoint C for the blades of the main rotor, the control setpoint C being a function of a current position of a control member; and a detection step consisting in detecting a current state from at least two distinct states of the rotorcraft, namely a "ground" state in which the rotorcraft is in contact with the ground, at least in part, and a "flight" state in which the rotorcraft is at least being sustained in the air.

According to the invention, the method is remarkable in that, after the manual control step and after the detection step, it comprises a management step consisting in automatically controlling the speed NR on at least two mutually distinct predetermined speeds NR1 and NR2, the at least two predetermined speeds NR1 and NR2 being selected as alternatives as a function firstly of the control setpoint C delivered by the control member, and secondly the detected current state of the rotorcraft. Such a management step serves to control the speed NR on:

a first speed NR1 when the control setpoint C delivered by the control member is greater than a first predetermined threshold value C1; and a second speed NR2 less than the first speed NR1 when the following two conditions are satisfied;

the control setpoint C delivered by the control member is less than or equal to the first predetermined threshold value C1; and he detected current state of the rotorcraft corresponds to the "ground" state.

In other words, the management step serves to control the speed NR automatically between a first speed NR1 and a second speed NR2 or vice versa as a function of the position of the control member and a function of the current state of the rotorcraft as detected during the detection step.

Such a method is thus adapted to act automatically to reduce the sound level generated by a rotorcraft, and more precisely by the rotation of its main rotor, during certain operations on the ground and in particular while taxiing on a runway prior to takeoff or after landing.

Advantageously, the management step may control the speed NR on a third speed NR3 less than the second speed NR2 when the control setpoint C delivered by the control member is less than or equal to a second predetermined threshold value C2 and when the detected current state of the rotorcraft corresponds to the "ground" state, the second predetermined threshold value C2 being less than the first predetermined threshold value C1.

Under such circumstances, the management step enables the control of the speed NR to be reduced even further to a speed NR3 that is less than the nominal speed NR1. By way of example, such a speed NR3 may be representative of a minimum continuous regulated speed of the power plant while the rotorcraft is stationary relative to the ground.

In a particular implementation, the management step may control the speed NR, at least temporarily, on a fourth speed NR4 greater than the first speed NR1 when a selector member is manually actuated by a pilot, such a selector member being arranged on a high panel of a cockpit of the rotorcraft.

In this way, the management step enables the speed NR to be increased temporarily to a speed NR4 greater than the nominal speed NR1 and to inhibit the piloting relationship corresponding to the "ground" state in order to ensure hovering performance independently of the takeoff dynamics controlled by the pilot.

In practice, the method may include a verification step for acting at regular time intervals to verify an operating state of an engine of the rotorcraft for driving rotation of the main rotor. The verification step then transmits to the management step information representative of an engine failure in order to enable the management step to inhibit any reduction of the speed NR when the detected current state corresponds to the "ground" state.

Thus, such a regulation method makes it possible to avoid reducing the controlled speed NR in the event of an engine failure in the rotorcraft. Under such circumstances, the position of the control member, or indeed the detected current state of the rotorcraft, matters little and the management step controls the speed NR on the nominal speed NR1.

Advantageously, the method may include a calculation step for acting at regular time intervals to calculate the absolute travel speed of the rotorcraft. The management step then serves to control the speed NR on:

the first speed NR1 when the following two conditions are satisfied:
  the detected current state of the rotorcraft corresponds to the "ground" state; and
  the absolute travel speed of the rotorcraft is greater than a first predetermined absolute travel speed V1; and the second speed NR2 when the following three conditions are satisfied;
  the control setpoint C delivered by the control member is less than or equal to the first predetermined threshold value C1;
  the detected current state of the rotorcraft corresponds to the "ground" state; and the absolute travel speed of the rotorcraft is less than or equal to the predetermined absolute travel speed V1.

In other words, such a step of calculating the absolute speed of the rotorcraft serves to avoid servo-controlling the speed NR on the second speed NR2 if the travel speed of the rotorcraft is greater than the predetermined absolute travel speed V1. This travel speed is then representative of a speed of travel in flight and may consequently inhibit an erroneous detection of the current state of the rotorcraft corresponding to a "ground" state.

Furthermore, the method may include a measurement step for measuring at regular time intervals the altitude of the rotorcraft relative to the ground, the management step serving to control the speed NR on:

the first speed NR1 when the following two conditions are satisfied:
  the detected current state of the rotorcraft corresponds to the "ground" state; and
  the altitude of the rotorcraft relative to the ground is greater than a predetermined altitude A1; and the second speed NR2 when the following three conditions are satisfied;
  the control setpoint C delivered by the control member is less than or equal to the first predetermined threshold value C1;
  the detected current state of the rotorcraft corresponds to the "ground" state; and
  the altitude of the rotorcraft relative to the ground is less than or equal to the predetermined altitude A1.

Consequently, such a step of measuring the altitude of the rotorcraft is suitable for avoiding controlling the speed NR on the second speed NR2 if the altitude of the rotorcraft relative to the ground is greater than the predetermined altitude A1. This altitude of the rotorcraft is then representative of the rotorcraft being in flight and can consequently inhibit an error in detecting a current state of the rotorcraft corresponding to the "ground" state.

BRIEF DESCRIPTION OF THE SEVERAL VIEWS OF THE DRAWINGS

The invention and its advantages appear in greater detail from the context of the following description of embodiments given by way of non-limiting indication and with reference to the accompanying figures, in which:

FIGS. 3 to 5 are curves showing the various stages of regulating the speed of rotation NR of a rotorcraft main rotor in accordance with the invention; and FIG. 6 is a diagram of a regulation method in accordance with the invention.

DETAILED DESCRIPTION OF THE INVENTION

Elements present in more than one of the figures are given the same references in each of them.

As mentioned above, the invention relates to the field of rotorcraft having at least a main rotor serving to provide the rotorcraft at least with lift.

Figure 1:
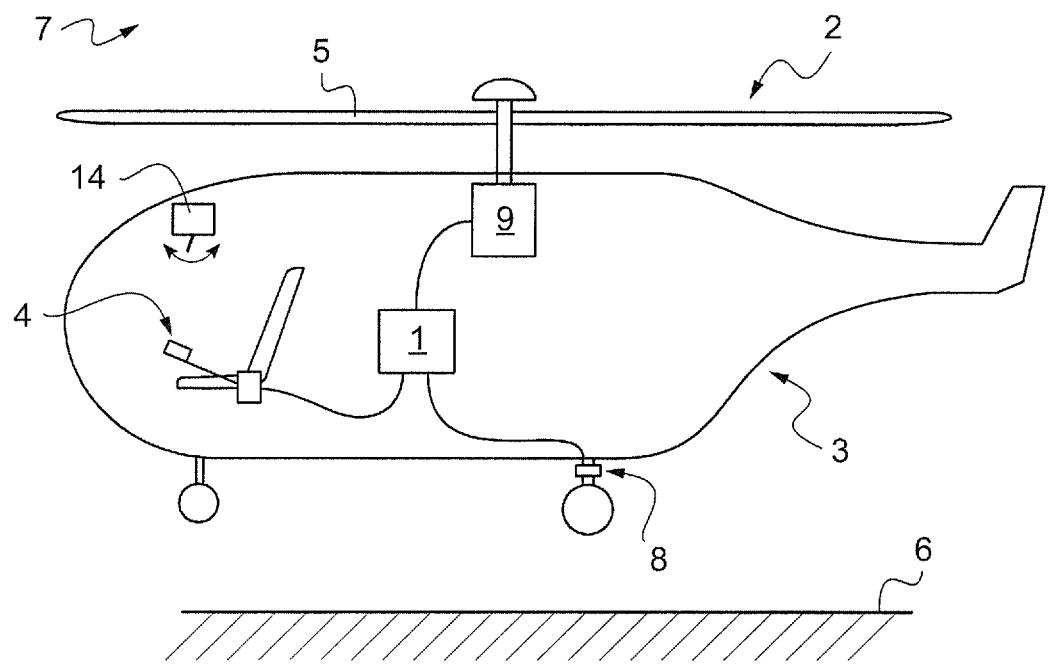
FIG. 1 is a diagrammatic side view of a rotorcraft in accordance with the invention.

As shown in FIG. 1, such a rotorcraft 3 includes a regulator device 1 for regulating the speed of rotation NR of the main rotor 2. Such a regulator device 1 is thus suitable for generating and transmitting a control setpoint C to an engine 9 driving the main rotor 2 in rotation.

Furthermore, such a regulator device 1 is connected to a manual flight control member 4, e.g. electrically by wires or by wireless communication means. Such a control member 4 then enables at least one control setpoint C for the collective pitch of the blades 5 of the rotor 2 to be given to the regulator device 1. This control setpoint C is then a function of a current position of the control member 4 moved by a pilot of the rotorcraft with pivoting movement, such as a collective pitch lever.

Furthermore, such a rotorcraft 3 may also include a selector member 14 on a high panel of the cockpit for the purpose of temporarily inhibiting the control setpoint C as supplied by the control member 4 in order to act manually to servo-control the control of the speed NR on a predetermined level associated with specific operational procedures.

Furthermore, such a rotorcraft 3 includes detector means 8 serving to detect a current state of the rotorcraft 3 from among two possible states, namely a "flight" state in which the rotorcraft is at least partially sustained in the air 7, and a "ground" state in which the rotorcraft 3 is at last partially in contact with the ground.

Such detector means 8 may be constituted in particular by force sensors for measuring mechanical action on at least one landing gear of the rotorcraft 3. Such force sensors are thus likewise electrically connected to the regulator device 1 in order to transmit information thereto about the current "ground" or "flight" state of the rotorcraft 3.

As mentioned above, in other particular embodiments, such as for example when the rotorcraft 3 has landing skids, the detector means 8 may be selected from the group comprising, in particular, air speed indicators, position sensors suitable for measuring the position of a collective pitch lever, or indeed altitude sensors.

Figure 2:
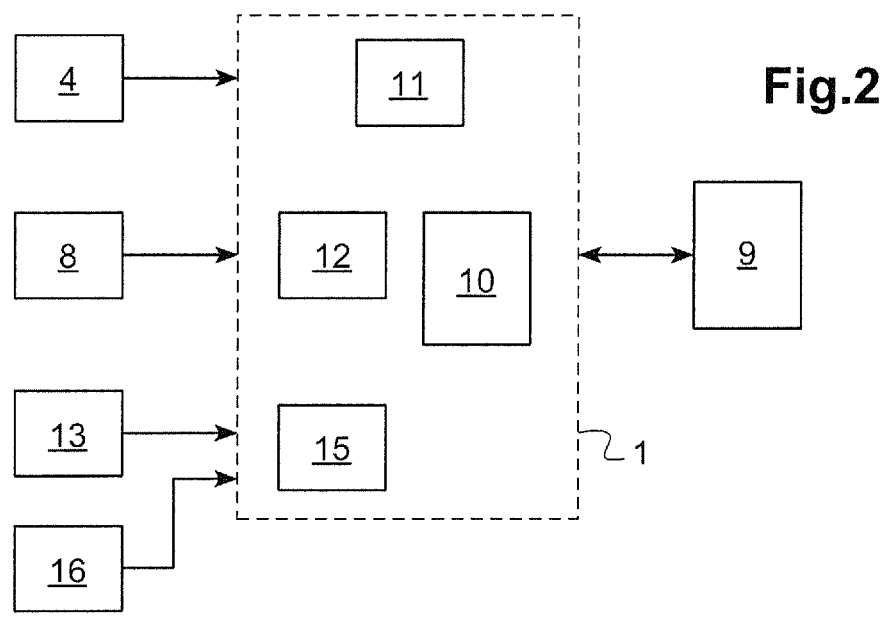
FIG. 2 is a block diagram of a regulator device in accordance with the invention.

As shown in FIG. 2, and as mentioned above with reference to FIG. 1, the regulator device 1 is thus connected to the control member 4 and to the detector means 8 in order to regulate the speed NR of the rotor 2 and thus the speed of rotation of the engine 9.

Thus, such a regulator device 1 comprises management means 10 enabling the speed NR to be controlled automatically in compliance with at least two mutually distinct predetermined speeds NR1 and NR2 in order to modify and reduce the speed of rotation of the rotor 2 when the necessary power is not at a maximum, i.e. in particular while the rotorcraft 3 is moving on the ground.

Furthermore, in order to avoid certain risks of accidents, such a regulator device 1 may also include verification means 11 for verifying proper operation of the engine 9. Such verification means 11 are thus connected to the management means 10 in order to control the speed NR on the first speed NR1 in the event of a failure of the engine 9.

Thus, in the event of a failure of the engine 9, the management means 10 make it possible to inhibit a reduction in the speed NR when the detected current state corresponds to the "ground" state.

In addition, the regulator device 1 also includes calculation means 12 serving in particular to calculate an absolute travel speed of the rotorcraft 3. As a function of the calculated speed, the regulator device 1 can then act above some predetermined absolute travel speed V1, e.g. equal to 40 kts, to adapt the command for the speed NR and prevent the management means 10 from controlling the speed NR on the second speed NR2.

For this purpose, at least one air speed indicator 13 may transmit information to the regulator device 1 representative of the speed of a stream of air flowing in the immediate environment of the rotorcraft 3.

Furthermore, the regulator device 1 also includes measurement means 15 for measuring the altitude of the rotorcraft 3 and for comparing this current altitude of the rotorcraft with a predetermined altitude A1. As a function of the measured altitude, the regulator device 1 can then adapt the control of the speed NR so as to avoid the management means 10 controlling the speed NR on the second speed NR2 above the predetermined altitude A1, e.g. equal to 10 ft.

For this purpose, at least one radio altimeter 16 can transmit information to the regulator device 1 representative of an altitude of the rotorcraft 3 relative to the ground.

Figure 3:
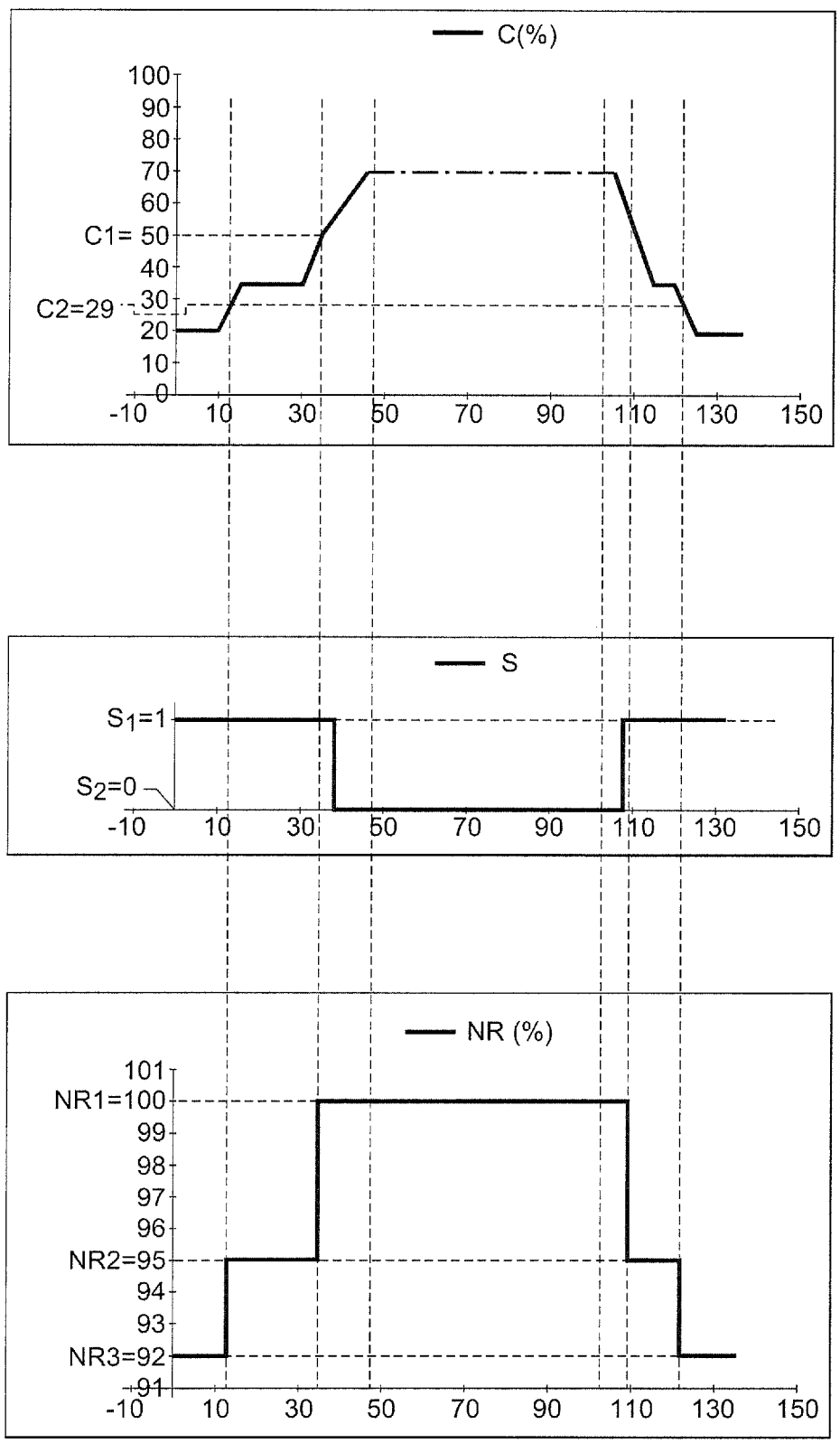

As mentioned above, and as shown in FIG. 3, the control setpoint C supplied by the control member 4 and the "ground" current state enable the setpoint for the speed NR to be modified automatically on various different predetermined speeds NR1, NR2, or NR3. The curve S is thus representative of the "ground" current state and is given the value S1 equal to 1 when the rotorcraft 3 is identified as being in the "ground" current state or the value S2 equal to 0 when the rotorcraft 3 is identified as being in the "flight" current state.

Thus, when the control setpoint C is greater than a first predetermined threshold value C1, the management means 10 control the speed NR on the first speed NR1 corresponding to the nominal speed NR of the rotor 2 of the rotorcraft 3 for enabling it to fly or to take off.

Nevertheless, if the control setpoint C is less than or equal to this first predetermined threshold value C1 and the current state of the rotorcraft 3 corresponds to the "ground" state as represented by the value S1 on the curve S representative of a "ground" state confirmation, the management means 10 control the speed NR on the second speed NR2, less than the first speed NR1.

In this way, when the pilot of the rotorcraft 3 seeks for example to move the rotorcraft 3 along a runway without taking off, the speed NR can remain at the level NR2, thereby limiting the sound nuisance produced by the rotation of the rotor 2. To do this, the pilot can then position the control member 4 in such a manner as to deliver a control setpoint C that is less than the first predetermined threshold value C1.

Likewise, when the control setpoint C is even smaller and becomes less than or equal to a second predetermined threshold value C2 and when the current state of the rotorcraft 3 corresponds to the "ground" state represented by the value S1 for the curve S representative of the "ground" state being confirmed, the management means 10 then automatically control the speed NR on a third speed NR3 that is less than the first speed NR1 and less than the second speed NR2.

Such circumstances may arise for example when the pilot seeks to remain stationary on a runway, in particular while the rotorcraft 3 is waiting. Such a speed NR3 may thus correspond to a minimum continuous regulated speed for the engine 9.

Furthermore, and as shown in FIG. 4, the calculation means 12 transmit the absolute value V for the travel speed of the rotorcraft 3 to the management means 10 as a function of the power P necessary for flight.

As mentioned above, the second and third speeds NR2 and NR3 are implemented by the management means 10 when the rotorcraft 3 is on the ground. The absolute travel speed V of the rotorcraft 3 is then less than a speed VD that cannot be reached until after the rotorcraft 3 has taken off.

Thus, the second speed NR2 enables taxiing operations to be performed on the runway at an absolute taxiing speed that is greater than VR. The third speed NR3 only enables the rotor 2 to be rotated at a minimum regulated speed without it being possible for the rotorcraft 3 to move relative to the ground, and thus when the travel speed V of the rotorcraft is at a minimum.

The first speed NR1 enables the rotorcraft 3 to take off. At this first speed NR1, the rotor then delivers power PD that enables the rotorcraft 3 to take off and thus reach the takeoff speed VD that is greater than the taxiing speed VR.

As shown in FIG. 5, and as already mentioned with reference to FIG. 1, the rotorcraft 3 may have a selector member 14 enabling an NR_HIGH signal to be delivered to the regulator device 1. The curve representative of this NR_HIGH signal is then equal to 1 when it is activated.

Thus, if the pilot of the rotorcraft 3 actuates the selector member 14, then the management means 10 inhibit both the control specific to the "ground" state and causes the speed NR to be set at least temporarily on a fourth speed NR4 greater than the first speed NR1.

The use of such a selector member 14 can turn out to be necessary for certain types of takeoff or landing, in particular those requiring maximum power from the main rotor 2. The signal NR_HIGH may also be actuated when the curve S representative of the "ground" state being confirmed has the value S1 equal to 1.

As shown in FIG. 6, the invention also applies to a regulation method 20 for regulating the speed of rotation NR of the rotor 2 of the rotorcraft 3.

Such a regulation method 20 thus includes at least one control step 21 for delivering a control setpoint C representative of a current position of the control member 4. The method also includes at least one detection step 22 consisting in detecting a current state of the rotorcraft from among at least two states, namely a "ground" and a "flight" state.

Furthermore, such a method 20 also includes a management step 26 for controlling the speed NR on at least two predetermined speeds NR1 and NR2 as explained above with reference to FIG. 3.

In addition, the regulation method 20 may also include in auxiliary manner various other steps seeking in particular to reduce the risks of accident for such a rotorcraft in the event of a malfunction of the detector means 8 used in the detection step 22.

Thus, a verification step 23 may enable the current operating state of the engine 9 to be verified and thus enable a reduction in the speed NR to be inhibited in the event of a failure of the engine 9 during a detected current state corresponding to the "ground" state.

Likewise, a calculation step 24 enables the absolute travel speed of the rotorcraft 3 to be calculated. In this way, it can be ensured that when the detected current state corresponds to a "ground" state, the rotorcraft is not moving in the air at a speed greater than a predetermined absolute travel speed V1. Such safety checking thus serves to avoid the management step 26 reducing the speed NR to the second speed NR2 in the event of a malfunction of the detector means 8.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present description.

What is claimed is:

1. A device for regulating the speed of rotation of at least one main rotor of a rotorcraft, which speed is known as the speed NR, the rotorcraft comprising:
   at least one manual flight control member for delivering a collective pitch control setpoint C for the blades of the at least one main rotor, the control setpoint C being a function of a current position of the at least one control member; and
   detector means enabling a current state to be detected from at least two distinct states of the rotorcraft, namely a "ground" state in which the rotorcraft is in contact with the ground, at least in part, and a "flight" state in which the rotorcraft is at least being sustained in the air;
   wherein the device for regulating the speed NR includes management means for automatically controlling the speed NR on at least two mutually distinct predetermined speeds NR1 and NR2, the at least two predetermined speeds NR1 and NR2 being selected as alternatives as a function firstly of the control setpoint C delivered by the control member, and secondly of the current state of the rotorcraft as detected by the detector means, the management means serving to control the speed NR on:
   a first speed NR1 when the control setpoint C delivered by the control member is greater than a first predetermined threshold value C1; and
   a second speed NR2 less than the first speed NR1 when the following two conditions are satisfied;
      the control setpoint C delivered by the control member is less than or equal to the first predetermined threshold value C1; and
      the detected current state of the rotorcraft corresponds to the "ground" state.

2. A device according to claim 1, wherein the management means control the speed NR on a third speed NR3 less than the second speed NR2 when the control setpoint C delivered by the control member is less than or equal to a second predetermined threshold value C2 and when the detected current state of the rotorcraft corresponds to the "ground" state, the second predetermined threshold value C2 being less than the first predetermined threshold value C1.

3. A device according to claim 1, wherein the rotorcraft includes a selector member serving, when the selector member is actuated by a pilot of the rotorcraft, to deliver an instruction manually to the management means in order to control the speed NR at least temporarily on a fourth speed NR4 greater than the first speed NR1.

4. A device according to claim 1, wherein the device includes verification means for acting at regular time intervals to verify an operating state of an engine of the rotorcraft for driving rotation of the at least one main rotor, the verification means being suitable for transmitting information to the management means representative of an engine failure in order to enable the management means to inhibit any reduction of the speed NR when the detected current state corresponds to the "ground" state.

5. A device according to claim 1, wherein the device includes calculation means for acting at regular time intervals to calculate the absolute travel speed of the rotorcraft, the management means serving to control the speed NR on:
   the first speed NR1 when the following two conditions are satisfied:
      the detected current state of the rotorcraft corresponds to the "ground" state; and
      the absolute travel speed of the rotorcraft is greater than a predetermined absolute travel speed V1; and
   the second speed NR2 when the following three conditions are satisfied;
      the control setpoint C delivered by the control member is less than or equal to the first predetermined threshold value C1;
      the detected current state of the rotorcraft corresponds to the "ground" state; and
      the absolute travel speed of the rotorcraft is less than or equal to the predetermined absolute travel speed V1.

6. A device according to claim 1, wherein the device includes measurement means for acting at regular time intervals to measure the altitude of the rotorcraft relative to the ground, the management means serving to control the speed NR on:
   the first speed NR1 when the following two conditions are satisfied:
      the detected current state of the rotorcraft corresponds to the "ground" state; and
      the altitude of the rotorcraft relative to the ground is greater than a predetermined altitude A1; and
   the second speed NR2 when the following three conditions are satisfied;
      the control setpoint C delivered by the control member is less than or equal to the first predetermined threshold value C1;
      the detected current state of the rotorcraft corresponds to the "ground" state; and
      the altitude of the rotorcraft relative to the ground is less than or equal to the predetermined altitude A1.

7. A device according to claim 1, wherein the first predetermined threshold value C1 lies in a range of values extending from 30% to 60% of a maximum setpoint corresponding to an extreme position for the control member.

8. A device according to claim 2, wherein the second predetermined threshold value C2 lies in a range of values extending from 15% to 40% of a maximum setpoint corresponding to an extreme position of the control member.

9. A rotorcraft including:
   at least one main rotor driven by at least one engine;
   at least one manual flight control member for delivering a collective pitch control setpoint C for the blades of the at least one main rotor, the control setpoint C being a function of the current position of the at least one control member; and
   detector means for detecting a current state from among at least two distinct states of the rotorcraft, namely a "ground" state in which the rotorcraft is in contact with the ground, at least in part, and a "flight" state in which the rotorcraft is at least being sustained in the air;
   wherein the rotorcraft includes a regulator device for regulating the speed NR in accordance with claim 1.

10. A method of regulating the speed of rotation of at least one main rotor of a rotorcraft known as the speed NR, the method comprising at least the steps consisting in:
   a manual flight control step for delivering a collective pitch control setpoint C for the blades of the at least one main rotor, the control setpoint C being a function of a current position of at least one control member; and
   a detection step consisting in detecting a current state to be detected from at least two distinct states of the rotorcraft, namely a "ground" state in which the rotorcraft is in contact with the ground, at least in part, and a "flight" state in which the rotorcraft is at least being sustained in the air;
   wherein, after the manual control step and after the detection step, the method comprises a management step consisting in automatically controlling the speed NR on at least two mutually distinct predetermined speeds NR1 and NR2, the at least two predetermined speeds NR1 and NR2 being selected as alternatives as a function firstly of the control setpoint C delivered by the control member, and secondly the detected current state of the rotorcraft, the management step serving to control the speed NR on:
   a first speed NR1 when the control setpoint C delivered by the control member is greater than a first predetermined threshold value C1;
   a second speed NR2 less than the first speed NR1 when the following two conditions are satisfied;
      the control setpoint C delivered by the control member is less than or equal to the first predetermined threshold value C1; and
      the detected current state of the rotorcraft corresponds to the "ground" state.

11. A method according to claim 10, wherein the management step controls the speed NR on a third speed NR3 less than the second speed NR2 when the control setpoint C delivered by the control member is less than or equal to a second predetermined threshold value C2 and when the detected current state of the rotorcraft corresponds to the "ground" state, the second predetermined threshold value C2 being less than the first predetermined threshold value C1.

12. A method according to claim 10, wherein the management step controls the speed NR, at least temporarily, on a fourth speed NR4 greater than the first speed NR1 when a selector member is manually actuated by a pilot, the selector member being arranged on a high panel of a cockpit of the rotorcraft.

13. A method according to claim 10, wherein the method includes a verification step for acting at regular time intervals to verify an operating state of an engine of the rotorcraft for driving rotation of the at least one main rotor, the verification step being suitable for transmitting to the management step information representative of an engine failure in order to enable the management step to inhibit any reduction of the speed NR when the detected current state corresponds to the "ground" state.

14. A method according to claim 10, wherein the method includes a calculation step for calculating at regular time intervals the absolute travel speed of the rotorcraft, the management step serving to control the speed NR on:
   the first speed NR1 when the following two conditions are satisfied:
      the detected current state of the rotorcraft corresponds to the "ground" state;
      the absolute travel speed of the rotorcraft is greater than a predetermined absolute travel speed V1; and
   the second speed NR2 when the following three conditions are satisfied;
      the control setpoint C delivered by the control member is less than or equal to the first predetermined threshold value C1;
      the detected current state of the rotorcraft corresponds to the "ground" state; and
      the absolute travel speed of the rotorcraft is less than or equal to the predetermined absolute travel speed V1.

15. A method according to claim 10, wherein the method includes a measurement step for measuring at regular time intervals the altitude of the rotorcraft relative to the ground, the management step serving to control the speed NR on:
   the first speed NR1 when the following two conditions are satisfied:
      the detected current state of the rotorcraft corresponds to the "ground" state; and
      the altitude of the rotorcraft relative to the ground is greater than a predetermined altitude A1; and
   the second speed NR2 when the following three conditions are satisfied;
      the control setpoint C delivered by the control member is less than or equal to the first predetermined threshold value C1;
      the detected current state of the rotorcraft corresponds to the "ground" state; and
      the altitude of the rotorcraft relative to the ground is less than or equal to the predetermined altitude A1.

* * * * *